(12) United States Patent
Siddens et al.

(10) Patent No.: US 12,386,929 B2
(45) Date of Patent: Aug. 12, 2025

(54) ENGINE FOR CONFIGURING AUTHENTICATION OF ACCESS REQUESTS

(71) Applicant: VISA INTERNATIONAL SERVICE ASSOCIATION, San Francisco, CA (US)

(72) Inventors: Cory Siddens, Mountain View, CA (US); Andrew John Bruno Naumann Zu Koenigsbrueck, Princeton, NJ (US); Ali Chamseddine, London (GB)

(73) Assignee: Visa International Service Association, San Francisco, CA (US)

( * ) Notice: Subject to any disclaimer, the term of this patent is extended or adjusted under 35 U.S.C. 154(b) by 212 days.

(21) Appl. No.: 18/004,299

(22) PCT Filed: Jul. 8, 2021

(86) PCT No.: PCT/US2021/040968
§ 371 (c)(1),
(2) Date: Jan. 4, 2023

(87) PCT Pub. No.: WO2022/011195
PCT Pub. Date: Jan. 13, 2022

(65) Prior Publication Data
US 2023/0252116 A1    Aug. 10, 2023

Related U.S. Application Data

(60) Provisional application No. 63/050,573, filed on Jul. 10, 2020.

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01); *G06F 2221/2113* (2013.01)

(58) Field of Classification Search
CPC ....... H04L 63/08; H04L 63/105; H04L 63/10; G06F 21/31; G06F 21/45; G06F 2221/2113

(Continued)

(56) References Cited

U.S. PATENT DOCUMENTS 5,950,195 A  *  9/1999  Stockwell ............... H04L 63/04
                                                   707/999.102
2003/0115142 A1    6/2003  Brickell et al.

(Continued)

FOREIGN PATENT DOCUMENTS

CN    105354708 A    2/2016
CN    109639731 A    4/2019

(Continued)

OTHER PUBLICATIONS

NPL Search Terms (Year: 2024).*

(Continued)

*Primary Examiner* — Syed A Zaidi
(74) *Attorney, Agent, or Firm* — Kilpatrick Townsend & Stockton LLP

(57) ABSTRACT

A method comprises a security evaluation computer receiving access data from a user device of a user during an access request. The security evaluation computer analyzes the access data using authentication rules that each specify one of a plurality of authentication protocols for authenticating the user or the user device. At least one of the authentication rules specifies a security level flag for when no authentication is to be performed. The security evaluation computer triggers a first authentication rule corresponding to a first authentication protocol of the plurality of authentication protocols and implements the first authentication protocol. The security evaluation computer sends an authorization request message to an authorization server in a manner (Continued)

consistent with the first authentication protocol and then receive an authorization response message. The security evaluation computer analyzes, using authorization rules, the access data and the authorization response message to determine whether to complete the access request.

19 Claims, 8 Drawing Sheets

(58) Field of Classification Search
USPC .......................................................... 726/21
See application file for complete search history.

(56) References Cited

U.S. PATENT DOCUMENTS

| | | | | |
|---|---|---|---|---|
| 2008/0056501 | A1* | 3/2008 | McGough | H04L 63/08 |
| | | | | 380/282 |
| 2009/0055924 | A1* | 2/2009 | Trotter | H04L 63/0853 |
| | | | | 726/20 |
| 2010/0011212 | A1* | 1/2010 | Anemikos | H04L 63/105 |
| | | | | 707/E17.014 |
| 2010/0042846 | A1* | 2/2010 | Trotter | H04L 63/104 |
| | | | | 235/375 |
| 2011/0209196 | A1* | 8/2011 | Kennedy | G06Q 30/02 |
| | | | | 726/1 |
| 2014/0189835 | A1 | 7/2014 | Umerley | |
| 2014/0245403 | A1* | 8/2014 | Li | H04L 12/66 |
| | | | | 726/4 |
| 2015/0294313 | A1 | 10/2015 | Kamal et al. | |
| 2016/0261606 | A1* | 9/2016 | Salvador | H04L 63/0263 |
| 2019/0386972 | A1 | 12/2019 | Boutnaru | |

FOREIGN PATENT DOCUMENTS

| | | |
|---|---|---|
| CN | 110633987 A | 12/2019 |
| KR | 20120045604 A | 5/2012 |
| KR | 101729661 B1 | 4/2017 |
| WO | 2020027866 A1 | 2/2020 |

OTHER PUBLICATIONS

NPL Search Terms (Year: 2025).*
Ali , "A Robust User Authentication Scheme for Wireless Sensor Network", A Thesis Presented to Ryerson University for the Degree of Master of Applied Science in the Program of Electrical and Computer Engineering, 2013, 110 pages.
Application No. PCT/US2021/040968 , International Search Report and the Written Opinion, Mailed on Oct. 27, 2021, 12 pages.
Application No. EP21837569.9 , Extended European Search Report, Mailed on Nov. 3, 2023, 11 pages.
Application No. CN202180048382.3 , Office Action, Mailed On Apr. 27, 2025, 21 pages.

* cited by examiner

FIG. 4

| Order Data Quality (7 of 10 applied) | | | | | | | |
|---|---|---|---|---|---|---|---|
| Monitor 504 | Accept 506 | Review 508 | Reject 510 | Score 512 | Priority 514 | Execution Timing 516 | Rule 518 |
| ☒ | ☐ | ☐ | ☐ | 0 | | After Auth | Billing and/or shipping address not verifiable |
| ☒ | ☐ | ☐ | ☐ | 0 | | Before Auth 520  After Auth 522 | Correctable errors in addresses |
| ☒ | ☐ | ☐ | ☐ | 0 | | After Auth | Geolocation inconsistencies in request |

*FIG. 5*

ENGINE FOR CONFIGURING AUTHENTICATION OF ACCESS REQUESTS

CROSS-REFERENCES TO RELATED APPLICATIONS

The present application is a 371 application of International Application No. PCT/US2021/040968, with a international filing date of Jul. 8, 2021, which claims priority from and is a non-provisional application of U.S. Provisional Application No. 63/050,573, entitled "EXEMPTION ENGINE SYSTEM AND METHOD" filed Jul. 10, 2020, the entire contents of which are herein incorporated by reference for all purposes.

BACKGROUND

An unauthorized user may fraudulently request access to a resource using the authorization information of an authorized user. To prevent unauthorized access, a system may authenticate the user prior to authorizing the user to access the resource.

Multiple computers may be involved in routing and processing electronic communications as part of providing access to the resource. For example, an authentication check may be executed to authenticate the user and/or authorization checks may be executed. One or more of these checks may be executed by one or more different entities. Difficulties in coordination and communication between these various computers can delay and frustrate such a process for providing access to the resource.

Furthermore, various access requests may require different levels of security (e.g., authentication). It is difficult for each resource provider to individually determine if authentication of a user when requesting to access a resource is needed and to what extent that authentication is needed.

Embodiments of the disclosure address this problem and other problems individually and collectively.

SUMMARY

One embodiment is related to a method comprising: receiving, by a security evaluation computer, access data from a user device of a user during an access request. The access data can then be analyzed using authentication rules that each specify one of a plurality of authentication protocols for authenticating the user or the user device. At least one of the authentication rules can specify a security level flag for when no authentication is to be performed. After analyzing the access data, a first authentication rule corresponding to a first authentication protocol of the plurality of authentication protocols can be triggered. The first authentication protocol is then implemented. Then, an authorization request message is sent to an authorization server in a manner consistent with the first authentication protocol. An authorization response message can be received thereafter. Using authorization rules, the access data and the authorization response message can be analyzed to determine whether to complete the access request.

Another embodiment is related to a security evaluation computer. The security evaluation computer comprises a processor and a computer-readable medium coupled to the processor. The computer-readable medium can comprise code executable by the processor for implementing a method. The method can include the security evaluation computer receiving access data from a user device of a user during an access request. The security evaluation computer can then analyze the access data using authentication rules that each specify one of a plurality of authentication protocols for authenticating the user or the user device. At least one of the authentication rules specifies a security level flag for when no authentication is to be performed. After analyzing the access data, the security evaluation computer can trigger a first authentication rule corresponding to a first authentication protocol of the plurality of authentication protocols and then implement the first authentication protocol. The security evaluation computer can then send an authorization request message to an authorization server in a manner consistent with the first authentication protocol. After sending the authorization request message, the security evaluation computer can receive an authorization response message. The security evaluation computer can then analyze the access data and the authorization response message using authorization rules to determine whether to complete the access request.

Another embodiment is related to a method comprising: receiving, by a resource provider computer, access data from a user device of a user during an access request. The resource provider computer can then generate an authorization request message comprising the access data to a security evaluation computer. The security evaluation computer then analyzes the access data using authentication rules that each specify one of a plurality of authentication protocols for authenticating the user or the user device. At least one of the authentication rules can specify a security level flag for when no authentication is to be performed. Then, the security evaluation computer triggers a first authentication rule corresponding to a first authentication protocol of the plurality of authentication protocols and implements the first authentication protocol. The security evaluation computer then sends the authorization request message to an authorization server in a manner consistent with the first authentication protocol and receives an authorization response message. The security evaluation computer can further analyze, using authorization rules, the access data and the authorization response message to determine whether to complete the access request. The resource provider computer can then receive the authorization response message if the security evaluation computer determines to complete the access request. After receiving the authorization response message, the resource provider computer provides the authorization response message to the user device.

Further details regarding embodiments of the disclosure can be found in the Detailed Description and the Figures.

BRIEF DESCRIPTION OF THE DRAWINGS

FIG. 4 shows a first user interface according to embodiments.

FIG. 5 shows a second user interface according to embodiments.

TERMS

Figure 1:
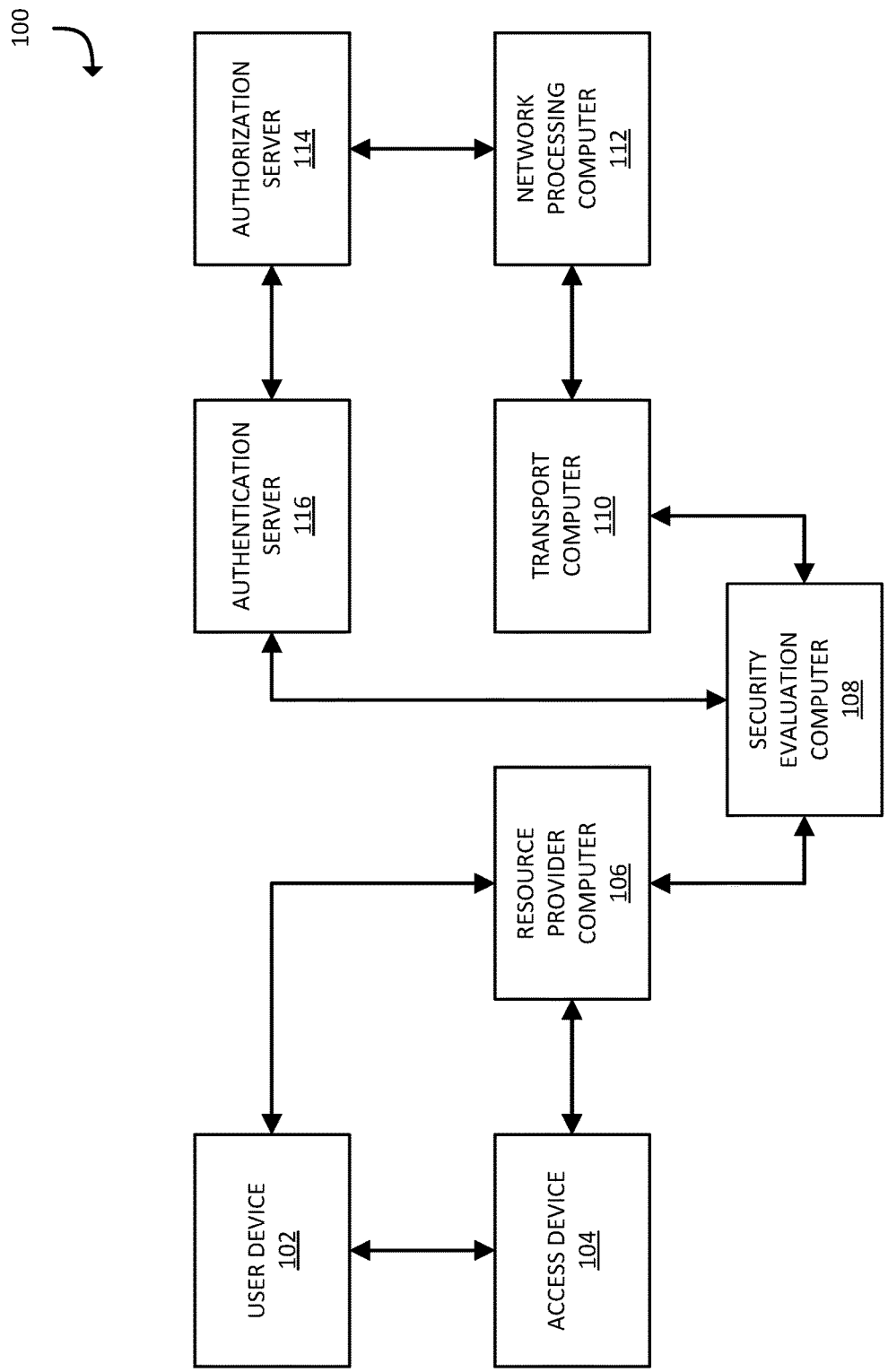
FIG. 1 shows a block diagram of an access request processing system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

A "resource provider" may be an entity that can provide a resource such as goods, services, information, and/or access. Examples of resource providers includes merchants, data providers, transit agencies, governmental entities, venue and dwelling operators, etc.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

"Access data" may include any suitable data that can be used to access a resource or create data that can access a resource. As an example, the resource may be a location and the access data may include data that can be used to access the location, such as ticket information for an event, data to access a building, transit ticket information, etc. As another example, access data could include data that can be used to obtain a resource. As another example, access data may be account information for a payment account. Account information may include a primary account number (PAN), payment token, expiration date, verification values, etc.

The term "access request" generally refers to a request to access a resource. The access request may be received from a requesting computer, a user device, or a resource computer, for example. The access request may include access data, as described above. The access request may also include and access data, such as an access request identifier, a resource identifier, a timestamp, a date, a device or computer identifier, a geo-location, or any other suitable information. An access request can be of any suitable type. For example, an access request can be a data access request, a secure webpage access request, a secure location access request, a transaction request, etc.

The term "rule" may include any procedure or definition used to determine a rule outcome based on certain criteria. In some embodiments, the rule may comprise one or more rule conditions and an associated rule outcome. A "rule condition" may specify a logical expression describing the circumstances under which the outcome is determined for the rule. A condition of the access rule may relate to an access request data element based on the data element having a specific value, based on the value being within a certain range, based on the value being above or below a threshold, or any combination thereof.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "flag" can be a value that acts as a signal for a function or process. A security level flag can be a flag that represents information regarding a security process. For example, a security level flag can indicate a security level of analyzed data (e.g., access data, etc.). In some embodiments, a security level flag can indicate an authentication protocol and/or authentication exemption. For example, a security level flag can indicate that a security evaluation computer determined that no authentication of a user and/or a user device is to be performed. As another example, a security level flag can indicate that a security evaluation computer determined that a third authentication protocol is to be performed due a "high risk," "high amount," etc. decision regarding access data.

An "authorization request message" may be an electronic message that requests authorization for an access request. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

The term "authentication process" can include a process for performing authentications. The authentication process may be used to authenticate a user or a user device during an access request. In some embodiments, the authentication process may be an active authentication where a user is prompted to provide authentication data (e.g., a password, token). In other embodiments, the authentication process may be a passive authentication where the user is not prompted to provide authentication data. In such embodiments, data may be retrieved from a user computing device (e.g., geolocation data) and compared to expected data.

"Authentication data" can include data generated and/or processed in association with authentication. Authentication data may indicate an authentication result (e.g., whether the user has been authenticated). Authentication data may include a code indicating the authentication result ("authentication code"). Authentication data may further include detailed information generated in the authentication process. As an example, authentication data may include biometric data used to arrive at an authentication result.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

DETAILED DESCRIPTION

Determining whether to grant access to a resource may involve multiple phases. First, a secure authentication process may be executed to authenticate the user or a user device (e.g., based on confirming the user is who they claim to be). Subsequently, an authorization process may be executed to authorize the access to the resource (e.g., based on resource access data such as payment credentials). Additionally, one or more authentication exemption rules may be performed. These processes may involve similar data sets and analyses. However, the processes may be performed in a disjoint fashion, resulting in duplicative work and unnecessary data storage.

In step-up authentication, a user may be prompted to enter additional information such as a password or token. However, resource providers are increasingly migrating to risk-based authentication due in part to a desire to decrease friction on the user. In some embodiments, resource providers can perform step-up authentication on each access request unless a security evaluation computer determines that an authentication exemption can be utilized. According to embodiments, the resource provider may implement a rule-based system to authenticate the user based on analyzing details of the access request. This may obviate the need for the user to be challenged to enter additional information.

Access requests may be selectively sent to an authentication computer for authentication. Sometimes, the access requests selected for authentication may be more "risky" or more likely to be fraudulent. However, it is not necessarily the case that simply because an access request has been selected for authentication, the access request is more likely to be fraudulent. Resource providers are feeling the brunt of fraudulent access due to the adoption of risk-based modeling. Without actual step-up, authorization systems may place authenticated access requests under increased scrutiny. The increased scrutiny results in more false positives, i.e., no access even when the request was not fraudulent.

Systems and methods disclosed herein provide a security evaluation computer that can evaluate access data received from a resource provider computer to at least determine an authentication protocol to implement prior to authorization of an access request. For example, the security evaluation computer can analyze the access data using authentication rules that each specify one of a plurality of authentication protocols for authenticating the user or the user device. In some embodiments, at least one of the authentication rules specifies a security level flag for when no authentication is to be performed. The security evaluation computer can generate the security level flag based on the received access data. The security evaluation computer can then trigger an authentication rule corresponding to a first authentication protocol of the plurality of authentication protocols and then implement the first authentication protocol.

Advantageously, the authorization computer can leverage the security level flag, computations, and/or authentications that were already performed by the security evaluation computer in evaluating an access request. The authorization computer may be able to reduce or even eliminate the amount of computations required, saving time and computational resources. This may, in turn, increase confidence and improve authorization rates. With the assurance that the security evaluation computer has already determined whether or not the user and/or the user device should be authenticated, as well as authenticate the user and/or the user device, the resource providers may be more inclined to attempt to authorize an access request. Further, by leveraging the preexisting authorization request message to pass authentication data and/or security level flags, there is no need to burden the system with additional messaging operations.

Furthermore, systems according to various embodiments provide for non-conventional routing of messages. In particular, a security evaluation computer can be included in the system to redirect access data from an authorization request messages, received from a resource provider computer, to an authentication server via an authentication request to authenticate a user and/or a user device in real time during the access request. The authentication server can response to the security evaluation computer with authentication data that can indicate whether or not the user and/or the user device is authentic. The security evaluation computer can then include the authentication data into the authorization request message, along with the access data, that is further provided to an authorization server for authorization. As discussed in further detail herein, the non-conventional routing of data and messages, according to various embodiments, provides for a number of advantages. For example, the security evaluation computer can determine whether or not the user and/or the user device is to be authenticated during the access request while not requiring every access request be authenticated.

I. Access Request Processing System

FIG. 1 shows a block diagram of an access request processing system according to embodiments. The system may receive requests from users to access a resource. The system may include an authentication server for determining whether to authenticate the user. The system may further include an authorization server for determining whether to authorize access to the resource. The system may further include a security evaluation computer that analyzes access data and implements authentication protocols based on the analysis, prior to sending an authorization request to the authorization server.

The system 100 comprises a user device 102, an access device 104, a resource provider computer 106, a security evaluation computer 108, a transport computer 110, a network processing computer 112, an authorization server 114, and an authentication server 116.

The user device 102 can be in operative communication with the access device 104 and the resource provider computer 106. The resource provider computer 106 can be in operative communication with the access device 104 and the security evaluation computer 108. The security evaluation computer 108 can be in operative communication with the transport computer 110 and the authentication server 116. The network processing computer 112 can be in operative communication with the transport computer 110 and the authorization server, which can be in operative communication with the authentication server 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the computers in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 may be in any suitable form. For example, suitable user devices may be hand-held and compact so that they can fit into a user's pocket. Examples of user device 102 may include any device capable of accessing the Internet. Specific examples of user devices 102 include cellular or wireless phones (e.g., smartphones), tablet phones, tablet computers, laptop computers, desktop computers, personal digital assistants (PDAs), pagers, portable computers, smart cards, and the like.

A user can request access to a resource from the resource provider (e.g., a merchant, etc.) using the user device 102. For example, the user device 102 can perform an access request with the access device 104 or the resource provider computer 106. The access request can be a payment transaction (e.g., for the purchase of a good or service), a location access request (e.g., for access to a transit system), or any other suitable access request (e.g., access a secure webpage, access a secure location, etc.). The user device 102 can interact with an access device 104 at a resource provider location associated with resource provider computer 106. For example, the user may tap the user device 102 against an NFC reader in the access device 104. Alternately, the user can provide access data to the resource provider electronically, such as in an online access request. For example, the user device 102 can transmit access data to the resource provider computer 106.

For example, the user device 102 may accept input from a user comprising access data, in association with a user attempt to access a resource. The resource may, as nonlimiting examples, be a physical resource (e.g., a building or a lockbox) or an electronic resource (e.g., a local computer account, digital files or documents, a network database, an email inbox, a payment account, or a website login). As examples, the access data may include one or more of a user name, an account number, a token, a password, a personal identification number, a signature, and/or a digital certificate. The user device 102 may transmit the access data, in whole or in part, to the access device 104.

The access device 104 may include any suitable computational apparatus for controlling access to a resource. As examples, the access device 104 may be a point-of-sale device, a lockbox on a door, or a secure website. The access device 104 may, directly or via the user device 102, receive access data for accessing a resource. Based on the access data, the access device 104 may prepare a request for access to the resource. The access device 104 may transmit a request for access to the resource, comprising some or all of the received access data, to the resource provider computer 106.

The access device 104 and/or the user device 102 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example.

In one example, a user may enter one or more of an account number, a personal identification number, and/or a password into the access device 104, to request access to a physical resource (e.g., to open a locked security door in order to access a building). The access device 104, or a separate computer operatively connected to the access device 104, may generate and send an access request to the resource provider computer 106 to request access to the resource.

In another example, a user may operate the user device 102 to request access to an electronic resource (e.g., a website or a file). Such a request can be transmitted to the access device 104 from user device 102, which can forward the request to resource provider computer 106. The request can be transmitted wirelessly and may be encrypted. The request can be sent in response to user input at screen or voice command, or initiated by a gesture, e.g., by tapping a phone to a terminal.

In order to authorize the access request, an authorization request message may be generated by the access device 104 or the resource provider computer 106 and then forwarded to the security evaluation computer 108.

The security evaluation computer 108 can analyze the access data using authentication rules that can each specify one of a plurality of authentication protocols for authenticating the user and/or the user device 102. At least one of the authentication rules can specify a security level flag. In some cases, for example, the security level flag can indicate that no authentication is to be performed. The security evaluation computer 108 can trigger a first authentication rule corresponding to a first authentication protocol, and then implement the first authentication protocol.

The security evaluation computer 108 can transmit an authentication request to the authentication server 116 or transmit the authorization request message, including the security level flag, to the transport computer 110 based on the authentication protocol.

For example, the security evaluation computer 108 sends the authentication request to the authentication server 116 to authenticate the user and/or the user device 102. The authentication server 116 can perform authentication in any suitable manner based on data received in the authentication request message (e.g., a user device identifier, the access data, etc.). The authentication server 116 may be configured to validate (or authenticate) the user, user device, and/or an account associated with the user. The authentication server 116 can notify the authorization server 114 of the outcome of the authentication process (e.g., an indication of whether or not the user and/or the user device is authenticated). The authentication server 116 can provide an authentication response message to the security evaluation computer 108 indicating whether or not the user and/or the user device is authenticated.

The security evaluation computer 108 can send the authorization request message, including the security level flag and/or the authentication result, to the authorization server 114 via the transport computer 110 and the network processing computer 112. For example, after receiving the authorization request message from the security evaluation computer 108, the transport computer 110 transmits the authorization request message to the network processing computer 112. The network processing computer 112 then forwards the authorization request message to the corresponding authorization server 114 associated with an authorizing entity associated with, for example, credentials issued for and/or associated with the user and/or the user device 102.

After the authorization server 114 receives the authorization request message, the authorization server 114, in some embodiments, can verify that the user and/or the user device has been authenticated by the authentication server 116. In other embodiments, the authorization server 114 can verify that the security level flag indicates that the utilized authentication protocol is appropriate for the access data and/or user device 102.

In yet other embodiments, the authorization server 114 can determine that the security level flag is associated with an authentication protocol in which the user and/or the user device 102 does not need to be authenticated. The authorization server 114 can determine that the user and/or the user device 102 does not need to be authenticated and can proceed with the access request. In other cases, the authorization server 114 can determine that an authentication protocol should be initiated and can request the security evaluation computer 108 and/or the authentication server 116 perform a particular authentication protocol. The authorization server 114 can determine whether or not to authorize the access request based on the results of the authentication protocol.

After generating the authorization response message, the authorization server 114 transmits the authorization response message back to the network processing computer 112 to indicate whether the current access request is authorized (or not authorized). The network processing computer 112 then forwards the authorization response message back to the transport computer 110. In some embodiments, network processing computer 112 may decline the transaction even if the authorization server 114 has authorized the access request, for example depending on a value of a fraud risk score and/or any other suitable data.

After receiving the authorization response message, the transport computer 110 then sends the authorization response message to the security evaluation computer 108.

The security evaluation computer 108 can analyze the authorization response message and/or the access data, using authorization rules, to determine whether to complete the access request. For example, the security evaluation computer 108 can determine whether or not an address provided by the user includes correctable errors (e.g., the word "street" is misspelled as "streat," etc.). The security evaluation computer 108 can determine to decline the access request or request further authentication (e.g., if authentication has not yet been performed) based on errors in the provided address.

After the security evaluation computer 108 determines that the access request can proceed, the security evaluation computer 108 can transmit the authorization response message to the resource provider computer 106.

After the resource provider computer 106 receives the authorization response message, the resource provider computer 106 can provide the authorization response message to the user device 102 and/or the access device. In some embodiments, the authorization response message, or the indication of whether or not the access request is authorized, is displayed by the access device 125, or may be printed out on a physical receipt and provided to the user of the user device 102. Alternately, if the transaction is an online transaction, the resource provider computer 106 may provide a web page or other indication of the authorization response message as a virtual receipt. The receipts may include access data for the access request.

II. Security Evaluation Computer

A security evaluation computer can be present in the access request processing system. The security evaluation computer can include an authentication configuration module (e.g., an exemption engine) configured to determine one or more exemptions or other instances where one or more types of authentication can be skipped or enforced. In some embodiments, the security evaluation computer may be configured to manage and evaluate access requests.

Figure 2:
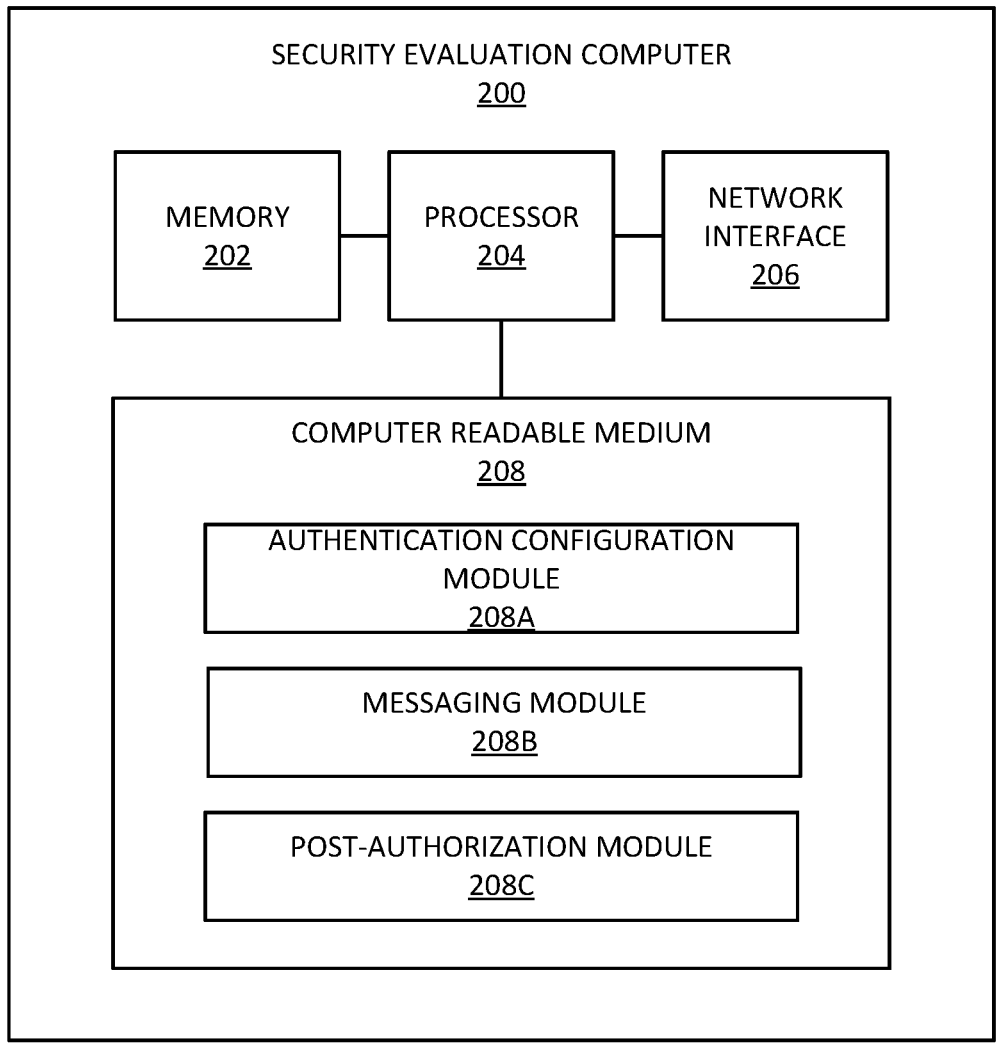
FIG. 2 shows a block diagram of components of an exemption engine according to embodiments.

FIG. 2 shows a block diagram of a security evaluation computer 200 according to embodiments. The exemplary security evaluation computer 200 may comprise a processor 204. The processor 204 may be coupled to a memory 202, a network interface 206, and a computer readable medium 208. The computer readable medium 208 can comprise an authentication configuration module 208A, a messaging module 208B, and a post-authorization module 208C. In some embodiments, the security evaluation computer 200 may be in operative communication with a rules database 220.

The security evaluation computer 200 can allow resource provider computers to optimize exemptions. For example, the security evaluation computer 200 can provide a user interface to a resource provider to configure PSD2 SCA exemptions. The security evaluation computer 200 can include a multi component solution that utilizes a decision manager rules engine and machine learning models. For example, the security evaluation computer 200 provides resource providers with capabilities to detect high risk access requests (e.g., transactions, data access request, etc.) and equally identify access requests qualified for authentication exemption. Resource providers can configure authentication exemption strategies and maintain a balance between risk, user experience, processing cost, and compliance.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store security level flags, exemption rules, access data, authorization rules, etc.

The computer readable medium 208 may comprise code, executable by the processor 204, for performing various methods. For example, computer readable medium 208 may comprise code, executable by the processor 204, for performing a method including receiving access data from a user device of a user during an access request. Then the security evaluation computer can analyze the access data using authentication rules that each specify one of a plurality of authentication protocols for authenticating the user or the user device. At least one of the authentication rules can specify a security level flag for when no authentication is to be performed. The security evaluation computer can then trigger a first authentication rule corresponding to a first authentication protocol of the plurality of authentication protocols. After triggering the first authentication rule, the security evaluation computer can implement the first authentication protocol. The security evaluation computer can then send an authorization request message to an authorization server in a manner consistent with the first authentication protocol and then receive an authorization response message. After receiving the authorization response message from the authorization server, the security evaluation computer can analyze, using authorization rules, the access data and the authorization response to determine whether to complete the access request.

The authentication configuration module 208A can include may comprise code or software, executable by the processor 204, for determining exemptions applicable to an access request. For example, the authentication configuration module 208A, in conjunction with the processor 204, can analyze received access data using authentication rules that each specify one of a plurality of authentication protocols for authenticating the user or the user device. The authentication configuration module 208A, in conjunction with the processor 204, may comprise code for determining whether to apply an exemption or other rule to skip or enforce one or more types of authentication. An exemption may be applied causing the system to skip or execute various authentication operations. Exemptions may be applied based on configurable rules. For example, exemptions may apply for transactions below a threshold amount, whitelists, based on risk rules, and/or the like. In some embodiments, the authentication configuration module 208A, in conjunction with the processor 204 can further, trigger an authentication rule corresponding to an authentication protocol of the plurality of authentication protocols, and then implement the first authentication protocol.

The authentication configuration module 208A, in conjunction with the processor 204, can determine a security level flag. A security level flag can be a flag that represents information regarding a security process. For example, a security level flag can indicate a security level of access data. In some embodiments, a security level flag can indicate an authentication protocol and/or authentication exemption. For example, the authentication configuration module 208A, in conjunction with the processor 204, can determine that no authentication is to be performed due to an exemption of "low amount," "low risk," etc. The authentication configuration module 208A, in conjunction with the processor 204, can generate a security level flag that indicates that no authentication is to be performed. The security level flag can include information regarding the authentication protocol and/or the exemption.

The messaging module 208B can include may comprise code or software, executable by the processor 204, for preparing and transmitting messages. The messaging module 208B, in conjunction with the processor 204, may further be configured to accept and analyze messages (e.g., authentication response messages). The messaging module 208B may include functionality to generate authentication request messages and authorization request messages. The messaging module 208B, in conjunction with the processor 204, can prepare the messages to contain information generated by the authentication configuration module 208A and/or received in an authentication response message, such as authentication data, etc. The messaging module 208B may include functionality to transmit authentication request messages and authorization request messages.

The post-authorization module 208C can include may comprise code or software, executable by the processor 204, for evaluating an access request post-authorization. In some cases, although the authorization computer has approved access to a resource, the post-authorization module 208C, in conjunction with the processor 204, may determine to decline the access request. For example, the authorization operations may reveal that certain credentials are invalid, in which case the post-authorization module 208C, in conjunction with the processor 204, may determine, post-authorization, that an access request should be declined.

In some embodiments, the security evaluation computer 200 may be in operative communication with the rules database 220. The rules database 220 can include any suitable database. The database may be a conventional, fault tolerant, relational, scalable, secure database such as those commercially available from Oracle™ or Sybase™. The exemption rules may specify criteria for identifying an exemption associated with the access request. Each of the exemption rules may include one or more conditions corresponding to one or more parameters of the access request. Other rules (besides exemption rules) can specify when a particular type of authentication is to be enforced or skipped. Embodiments may implement any such rules, including exemption rules.

The security evaluation computer 200 can perform any other suitable security evaluations. For example, the security evaluation computer 200 can further run the exemption engine during pre-authorization and post-authorization phases. In some embodiments, an exemption qualification module can allow resource providers to create rules to detect exemptions. In some embodiments, the security evaluation computer 200 can perform an access request risk analysis (e.g., a transaction risk analysis (TRA)). The TRA can include signals for authorizing entities and acquirers including out of scope (e.g., one leg out/international payment and MOTO (mail order/telephone order)). The security evaluation computer 200 can also, in some embodiments, whitelist a resource provider (e.g., as a trusted beneficiary). During a security evaluation, such as determining whether or not to authenticate a user, the security evaluation computer 200 can take into account whether or not the resource provider is whitelisted. The security evaluation computer 200 can also allow resource providers to process exempted access requests directly with authorization, which can assist the resource providers to provide frictionless consumer experience and significantly reduce 3DS cost. The security evaluation computer 200 can provide automatic authentication retry mechanisms in situations in which an authorizing entity requires SCA after the security evaluation computer 200 determines that no authentication of the user is needed.

The network interface 206 may include an interface that can allow the security evaluation computer 200 to communicate with external computers. The network interface 206 may enable the security evaluation computer 200 to communicate data to and from another device (e.g., a resource provider computer, a transport computer, an authentication server, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

III. Access Request Processing

Embodiments can use the systems and apparatuses described herein to at least process an access request. During processing of the access request various computers can determine whether or not to authenticate the user, authenticate the user if needed, and authorize the access request. FIGS. 3-6 describe some examples of such methods. In some embodiments, the security evaluation computer described in reference to FIG. 3 may include the security evaluation computer 108 or the security evaluation computer 200 of FIGS. 1 and 2, respectively.

A. Authentication Protocol Determination and Implementation

Figure 3:
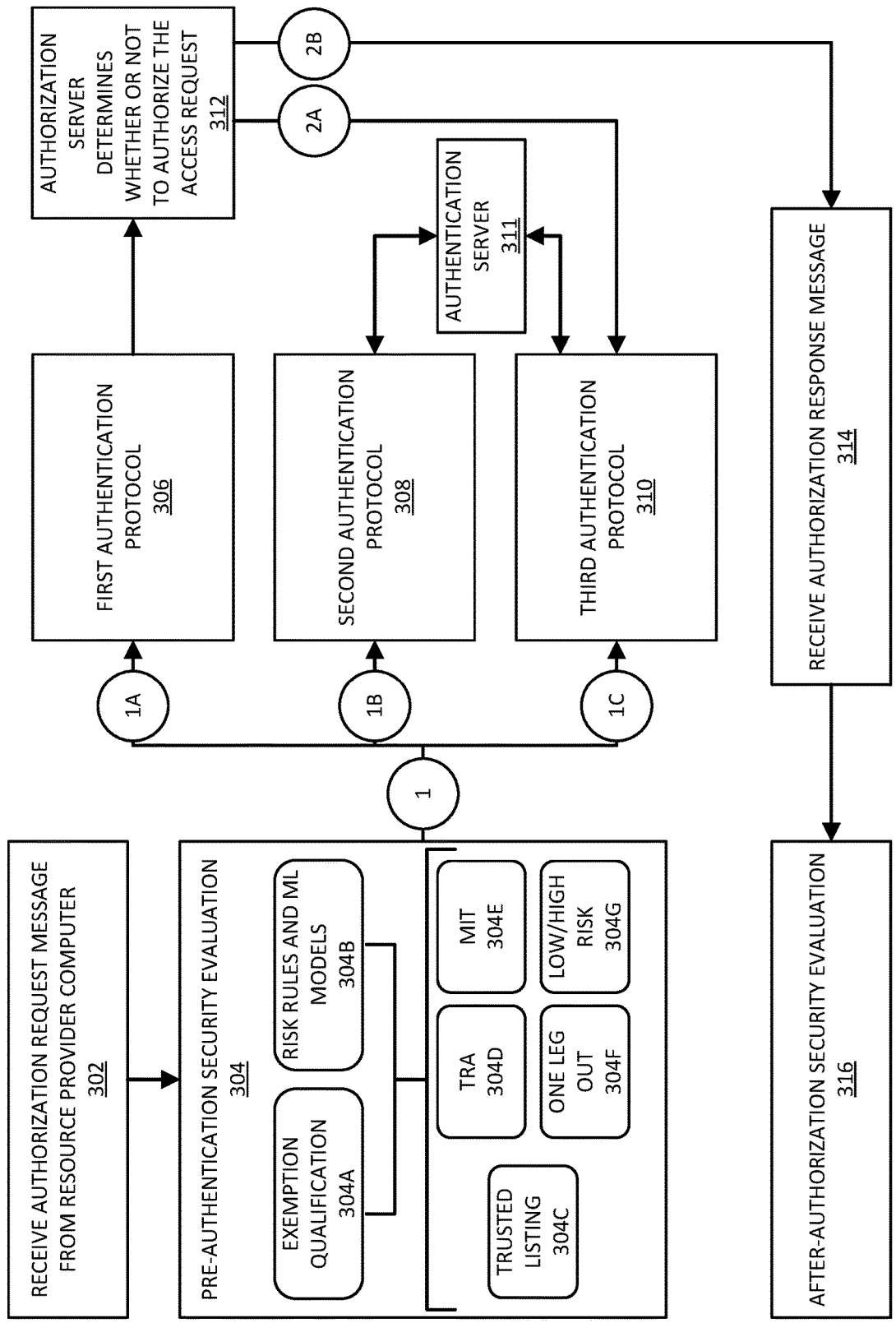
FIG. 3 shows a flowchart of an authentication protocol determination and implementation method according to embodiments.

FIG. 3 shows a flowchart of an authentication protocol determination and implementation method according to embodiments. The method illustrated in FIG. 3 will be described in the context of a security evaluation computer analyzing access data during an access request. The access request can be initiated by a user of a user device attempting to access a resource provided by a resource provider of a resource provider computer. For example, the access request can include a request to access a secure webpage (e.g., a secure webpage access request). It is understood, however, that the invention can be applied to other types of access requests (e.g., location access requests, payment transactions, data transfers, etc.). In some embodiments, access requests that take place in a particular geographic location (e.g., the United States, California, the European Economic Area, etc.) may default to a particular type of authentication protocol (e.g., step-up authentication, passive authentication, etc.). However, various exemptions may be available, as determined by a security evaluation computer, which may indicate the use of a different authentication protocol.

As an illustrative example, the security evaluation computer can allow a resource provider to configure various exemptions and authentication protocol utilization cases. For example, the resource provider can configure an authentication configuration module of the security evaluation computer to apply a first exemption rule prior to authorizing an access request. The first exemption rule can be that no authentication is needed if the access data of the access request is under (or over) a particular value (e.g., a data limit, a data velocity, a transaction amount, a number of items, an average item amount, etc.).

At block 302, the security evaluation computer receives an authorization request message from the resource provider computer during the access request between the user of the user device and the resource provider of the resource provider computer. For example, the security evaluation computer can receive access data from the user device of the user during the access request.

In some embodiments, the authorization request message can include a resource provider identifier that identifies the resource provider or the resource provider computer. The security evaluation computer can retrieve, from a memory or other suitable database, authentication rules for the following pre-authentication security evaluation process. The retrieved authentication rules can be associated with (e.g., stored in association with) the resource provider identifier.

At block 304, the security evaluation computer can perform a pre-authentication security evaluation process. In particular, the security evaluation computer can analyze the access data using authentication rules that each specify one of a plurality of authentication protocols for authenticating the user or the user device. At least one of the authentication rules can specify an exemption flag for when no authentication is to be performed. For example, the security evaluation computer can utilize exemption qualifications 304A, risk rules, and/or machine learning models 304B to determine whether or not a particular authentication rule applies to the present authorization request message comprising the access data.

Block 304 further indicates exemplary authentication rules that the security evaluation computer can determine to be applicable to the present authorization request message. For example, the authentication rules can include trusted listing 304C, TRA 304D, MIT 304E, one leg out 304F, and low/high risk 304G. The trusted listing 304C can be an authentication rule that can apply to an access request if the user, the user device, the resource provider, and/or the resource provider computer are included in a listing of trusted entities. The transaction risk analysis (TRA 304D) can be an authentication rule that can involve the security evaluation computer performing one or more risk analyses based on the authorization request message. The MIT 304E can be an authentication rule that can involve merchant initiated transactions, in some embodiments. The one leg out 304F can be an authentication rule that can involve one or more entities (e.g., user, resource provider, etc.) being located in a different geographical location than the rest of the entities involved in the access request. The low/high risk 304G authentication rule can involve determining whether or not the access request is classified as low risk or high risk based on any suitable features of the access request.

The security evaluation computer can analyze the access data and/or the authorization request message that can include, for example, a user device identifier, a PAN, a token, an expiration date, verification values, an amount, etc. The security evaluation computer can determine whether or not an authentication rule applies to the received data. In this example, the plurality of authentication protocols can include a first authentication protocol, a second authentication protocol, and a third authentication protocol.

For example, after triggering the first authentication protocol, the security evaluation computer can implement the first authentication protocol. For example, if the first authentication protocol is implemented, processing can proceed along path TA to block 306.

At block 306, the security evaluation computer can send the authorization request message to an authorization server in a manner consistent with the first authentication protocol. For example, the security evaluation computer can determine that the amount included in the authorization request message is less than a threshold indicated by a first authentication rule. For example, the amount can be 1 GB of data for a data transfer request initiated by the user. The first authentication rule can indicate that no authentication is needed if the amount is less than, for example, 2 GB. As such, the security evaluation computer can trigger the first authentication rule corresponding to a first authentication protocol. As another example, the first authentication rule can be a rule that indicates that no authentication is needed if the access request is determined to be low risk according to one or more risk rules and/or machine learning models executed by the security evaluation computer.

If the security evaluation computer triggers the first authentication rule corresponding to a first authentication protocol, then the security evaluation computer can generate a security level flag. The security level flag can indicate a security level of the access request. For example, the security level flag can relate to the triggered first authentication rule and/or the first authentication protocol. In some embodiments, the security level flag can indicate an exemption for why authentication of the user and/or the user device is not needed. For example, the security level flag can indicate that authentication was not performed due to a low value exemption, a low risk exemption, etc.

In other embodiments, at block 304, the security evaluation computer can analyze the access data and trigger a second authentication rule based on the analysis. For example, the second authentication rule can indicate that a determined risk level for the authorization request message indicates that the access request is low risk. However, the second authentication protocol can indicate to perform authentication even though the access request is determined to be low risk and that a low risk exemption to authentication is available. Further, the security evaluation computer can generate a security level flag that indicates that the access request is low risk, but authentication of the user and/or the user device is to be performed. In some embodiments, the security level flag can indicate a particular type of authentication process to authenticate the user and/or the user device. For example, the second authentication protocol can be to passively authenticate the user device (e.g., verify a user device identifier, etc. without requiring further input by the user of the user device).

After triggering the second authentication protocol, the security evaluation computer can implement the second authentication protocol. For example, if the second authentication protocol is implemented, processing can proceed along path 1B to block 308. At block 308, the security evaluation computer can communicate with an authentication server to authenticate the user device. For example, the security evaluation computer can generate an authentication request message requesting the authentication server to authenticate the user device according to the second authentication protocol as indicated by the security level flag.

At block 311, upon receiving the authentication request message, the authentication server can authenticate the user device according to the second authentication protocol. For example, the authentication server can verify that a user device identifier, or other data from the authorization request message, originated from the correct user device. For example, the user device may have a unique user device identifier that is pre-known by the authentication server. The authentication server can verify the user device identifier using a database.

After authenticating the user device, the authentication server can generate an authentication response message including authentication data that indicates whether or not he user device is authentic. The authentication server can provide the authentication response message to the security evaluation computer (not shown in FIG. 3). In other embodiments, the authentication server can directly provide the authentication data as well as other data received from the security evaluation computer (e.g., access data, security level flag, etc.) to the authorization server.

After receiving the authentication response message, the security evaluation computer can determine whether or not the user device was authenticated based on the authentication data. If the user device was not authenticated, then the security evaluation computer can generate an authorization response message indicating that the access request is not authorized and provide the authorization response message to the resource provider computer (not shown). If the user device was authenticated, then the security evaluation computer can provide an authorization request message to the authorization server in a manner consistent with the second authentication protocol. The authorization request message can include the access data, the authentication data, and the security level flag.

In yet other embodiments, at block 304, the security evaluation computer can analyze the access data and trigger a third authentication rule based on the analysis. For example, the third authentication rule can indicate that a determined risk level for the authorization request message indicates that the access request is high risk. The third authentication protocol can indicate to perform authentication since the access request is determined to be high risk and that no authentication exemption is available. Further, the security evaluation computer can generate a security level flag that indicates that the access request is high risk and that authentication of the user is to be performed. In some embodiments, the security level flag can indicate a particular type of authentication process to authenticate the user and/or the user device. For example, the third authentication protocol can be to actively authenticate the user device (e.g., a step-up authentication method that requires the user to provide information for authentication).

After triggering the third authentication protocol, the security evaluation computer can implement the third authentication protocol. For example, if the third authentication protocol is implemented, processing can proceed along path 1C to block 310. At block 310, the security evaluation computer can communicate with an authentication server to authenticate the user. For example, the security evaluation computer can generate an authentication request message requesting the authentication server to authenticate the user device according to the third authentication protocol as indicated by the security level flag.

At block 311, upon receiving the authentication request message, the authentication server can authenticate the user device according to the third authentication protocol. For example, the authentication server can provide the user device with an authentication challenge, challenging the user to authenticate themselves. For example, the authentication challenge can require the user to input a user biometric (e.g., a fingerprint), which the authentication server is capable of validating with a pre-stored user biometric. As another example, the authentication server can provide the user with a one-time-password via the user's email address, phone number, etc. and require that the user input the one-time-password into the user device to provide back to the authentication server for authentication.

After authenticating the user device, the authentication server can generate an authentication response message including authentication data that indicates whether or not the user device is authentic. The authentication server can provide the authentication response message to the security evaluation computer (not shown in FIG. 3). In other embodiments, the authentication server can directly provide the authentication data as well as other data received from the security evaluation computer (e.g., access data, security level flag, etc.) to the authorization server. For example, the third authentication protocol can indicate for the security evaluation computer to provide the authorization request message to the authentication server along with the authentication request message. The authentication server can then modify the authorization request message to include the authentication data. The authentication server can provide the modified authorization request message to the authorization server for authorization.

After receiving the authentication response message, the security evaluation computer can determine whether or not the user device was authenticated based on the authentication data. If the user device was not authenticated, then the security evaluation computer can generate an authorization response message indicating that the access request is not authorized and provide the authorization response message to the resource provider computer (not shown). If the user device was authenticated, then the security evaluation computer can provide an authorization request message to the authorization server in a manner consistent with the third authentication protocol. The authorization request message can include the access data, the authentication data, and the security level flag.

After performing the first authentication protocol at block 306, the second authentication protocol at block 308, or the third authentication protocol at block 310, the security evaluation computer provides the authorization request message to the authorization server (unless the user and/or the user device failed authentication and the access request was denied by the security evaluation computer).

At block 312, the authorization server can receive the authorization request message including at least the access data. The authorization request message can also include the security level flag and the authentication data. After receiving the authorization request message, the authorization server can determine whether or not the security level flag and authentication data, if provided, are sufficient for authorization of the access request. The authorization server can determine whether or not the security level flag indicates an authentication protocol consistent with the access data. For example, the authorization server can determine that the security level flag received from the security evaluation computer indicates that authentication was not performed (e.g., according to the first authentication protocol) since the amount is less than the predetermined threshold.

In some embodiments, the authorization server can evaluate the authorization request message and determine that authentication is to be performed, after the security evaluation computer determined that no authentication was to be performed. This may be due to any suitable reason, for example, high fraud rates associated with the resource provider, a determined high risk value associated with the access data, etc.

The authorization server can request the security evaluation computer to authenticate the user and/or the user device (e.g., via path 2A). For example, the authorization server can generate an authentication request message (or a retry authentication request) comprising the access data and any other suitable data. The authorization server can send the authentication request message to the security evaluation server. In some embodiments, the authentication request message can indicate a particular authentication protocol (e.g., a second authentication protocol, a third authentication protocol, etc.) to utilize to authenticate the user and/or the user device. In other embodiments, the authorization server can communicate directly with the authentication server to authenticate the user and/or the user device.

After receiving the authentication request message from the authorization server, the security evaluation computer can provide the authentication request message to the authentication server. The authentication server can proceed to authenticate the user and/or the user device using the indicated authentication protocol. The authentication server can authenticate the user and/or the user device, generate an authentication response message comprising authentication data, and provide the authentication response message to the authorization server via the security evaluation computer in some embodiments.

In some embodiments, after receiving the authentication response message comprising authentication data from the authentication server, the security evaluation computer can generate an additional authorization request message including at least the authentication data. The additional authorization request message can include any other suitable data (e.g., access data, etc.). The security evaluation computer can send the additional authorization request message to the authorization server in a manner consistent with the authentication protocol (e.g., second authentication protocol, third authentication protocol, etc.).

Upon receiving the authentication response message, the authorization server can determine whether or not to authorize the access request based on the authentication response message.

After determining whether or not the authorize the access request, processing can proceed along path 2B to block 314. For example, at block 314, the security evaluation computer can receive the authorization response message from the authorization server. The authorization response message can include an indication of whether or not the access request is authorized.

At block 316, after receiving the authorization response message, the security evaluation computer can analyze the access data and the authorization response message using authorization rules to determine whether to complete the access request. The security evaluation computer can perform an after-authorization security evaluation. For example, the security evaluation computer can evaluate another set of rules that the resource provider can control to accept or reject the access request after authorization. For example, a post-authorization rule can indicate that if the access request was authenticated and authorized, then to accept the access request. As another example, a post-authorization rule can indicate that if the access request was authorized, but there are inconsistencies in geolocation information provided throughout the access request (e.g., a user device location determined through authentication, a shipping address, a billing address, etc.), then the access request is to be rejected.

After determining whether or not to accept the access request, the security evaluation computer can provide the authorization response message to the resource provider computer. The resource provider computer can then notify the user of whether or not the access request is authorized or not authorized.

B. User Interfaces

Figure 4:
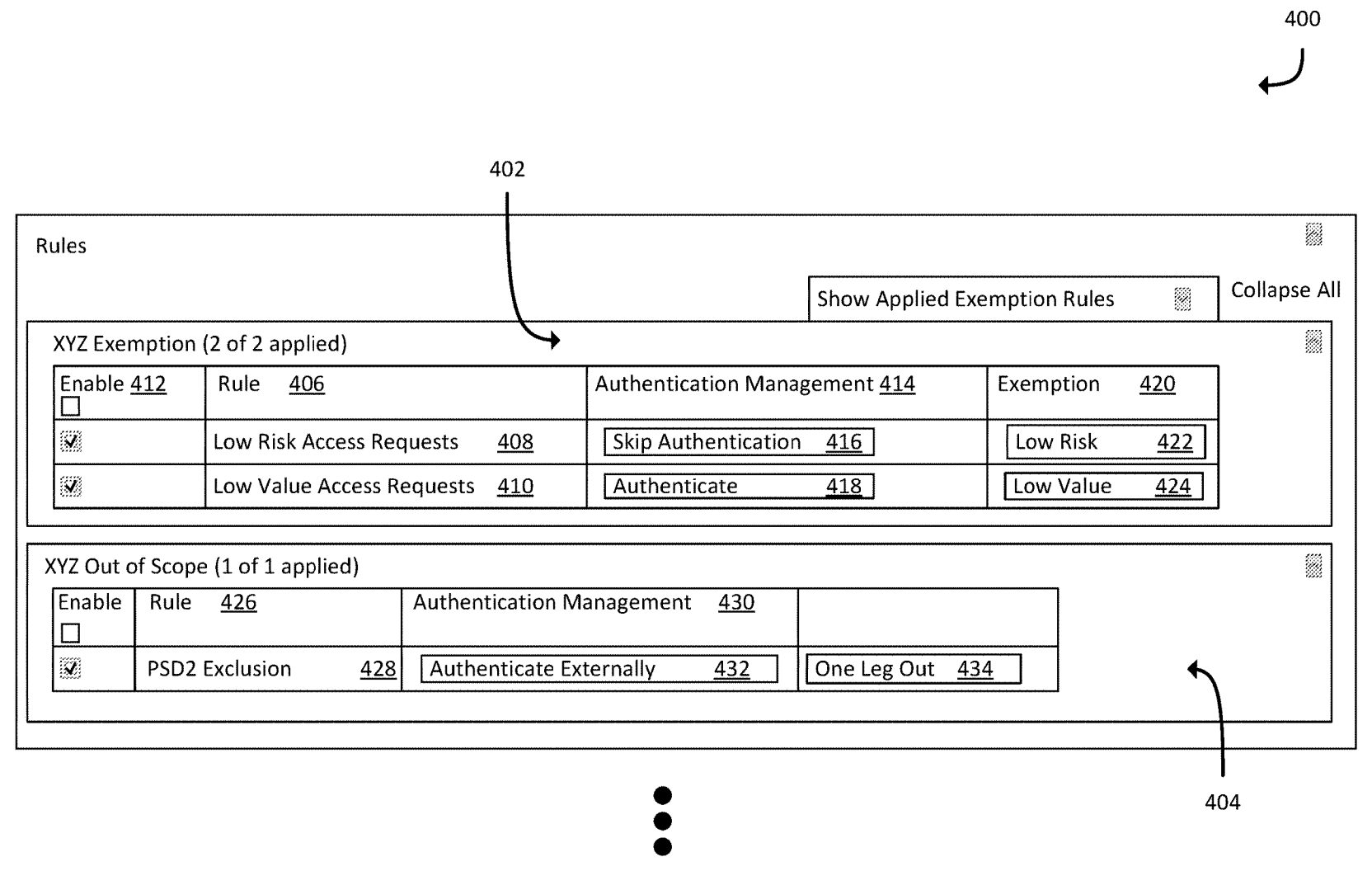

FIGS. 4-5 illustrate user interfaces that can be accessed by a resource provider of a resource provider computer. The user interface can be hosted and/or provided by a security evaluation computer to the resource provider computer, such that the resource provider can configure one or more pre-authorization rules and/or post-authorization rules regarding processing of access requests.

1. Pre-Authorization Rule Configuration

FIG. 4 shows a first user interface according to embodiments. A first user interface 400 illustrates a rules editor provided from the security evaluation computer to the resource provider computer such that the resource provider can configure various authentication and security rules and protocols. For example, the resource provider can configure execution timing fields to determine if the rule is performed prior to authorization of the access request. The first user interface 400 can be presented to a resource provider within a profile builder.

The first user interface 400 includes a grouping of exemption rules 402 and a grouping of out of scope rules 404. The grouping of exemption rules 402 can include a plurality of exemption rules 406. For example, the grouping of exemption rules 402 includes a first rule relating to low risk access requests 408 and a second rule relating to low value access requests 410. Each rule can be toggled, by a resource provider, to either be enabled or not enabled via an enablement toggle button 412. As illustrated in the first user interface 400, the low risk access requests rule 408 and the low value access requests rule 410 are both enabled.

Further, each rule can be associated with an authentication management field 414 that is configurable by the resource provider. As illustrated in the first user interface 400, the low risk access requests rule 408 is associated with an authentication management option 414 of "skip authentication" 416. As such, during an access request, if the access request is determined to be low risk, then the security evaluation computer can skip an authentication process (e.g., implement an authentication process in which authentication is not needed). The low value access requests rule 410 is associated with an authentication management option 414 of "authenticate" 418. As such, during an access request, if the access request is determined to have a low value 424, then the security evaluation computer can perform an authentication process even though the low value 424 qualifies for an exemption 420 to not authenticate the user.

The exemption 420 of low value 424 can be defined as any order that is under a particular value (e.g., under €30 in a transaction, under 0.5 GB in a data access request, etc.). The exemption 420 of low risk 422 can be where a transaction risk analysis (TRA) can be applied. For example, the security evaluation computer can determine that an access request is associated with a low-risk issuer or low-risk acquirer and can then be considered as low risk 422. In some embodiments, the security evaluation computer can determine that the access request is a low risk access request 408 when the resource provider is a trusted resource provider. For example, the trusted resource provider can present an application to the user on the user device to initiate the access request. The application itself may require that the user signs in or authenticates themselves (e.g., via a biometric such as a fingerprint or face shape) to the resource provider.

The grouping of out of scope rules 404 can include a plurality of out of scope rules 426. For example, the grouping of out of scope rules 404 includes a first rule relating to a PSD2 exclusion 428 in which the access request is a "one leg out" 434 request. The rule is associated with an authentication management option 430, configurable by the resource provider, of "authenticate externally" 432. The "one leg out" 434 type access request can be an access request in which one leg (e.g., portion) of the access request occurs in a first geographic area, jurisdiction, country, state, city, etc. while the rest of the access request occurs in a second geographic area, jurisdiction, country, state, city, etc.

There may be additional rules and associated exemptions than the ones illustrated in the first user interface 400. For example, various additional exemptions can include resource provider initiated access request, recurring access request, mail order, telephone order, trusted resource provider, secure corporate access request, data share, etc. For example, resource provider initiated access requests can include a card-in-wallet type transaction, which can be classified as out of scope because, the user is not on the resource provider's website or at the resource provider's location when the transaction occurs. Thus, there can be an exemption to indicate that the user does not need to be authenticated prior to sending the authorization request message to the authorization server. A recurring access request can be similar. For example, the recurring access request can occur at a regular rate. The user may not be on the resource provider's website to authenticate. The mail order and telephone order can be similar.

2. Post-Authorization Rule Configuration

FIG. 5 shows a second user interface according to embodiments. The second user interface 500 illustrates a rules editor provided from the security evaluation computer to the resource provider computer such that the resource provider can configure various authentication and security rules and protocols. For example, the resource provider can configure execution timing fields to determine if the rule is performed before authorization or after authorization.

The second user interface 500 includes a grouping of order data quality rules 502. Each rule can be toggled, by a resource provider, to either be monitored or not monitored via a monitor column 504. For example, if the resource provider does not want the security evaluation computer to monitor a particular rule, then the resource provider can deselect the monitor option for the rule. Further, each rule can include toggle options for accept 506, review 508, and reject 510 to indicate additional options for the rule.

Further, each rule in the second user interface 500 includes a score 512, a priority 514, an execution timing option 516, and a description of the rule 518. For example, the first rule is "billing and/or shipping address not verifiable." The resource provider can configure the execution timing option 516 to set when the rule is executed by the security evaluation computer. For example, the execution timing field 516 can be selected by the resource provider. Selecting the execution timing field 516 opens a dropdown menu which can allow the resource provider to select between "before authorization" 520 or "after authorization" 522.

The second user interface 500 also includes a second rule of "correctable errors in addresses" and a third rule of "geolocation inconsistencies in request." A resource provider can configure the authorization rules prior to an access request using the resource provider computer. The resource provider can select the execution timing option 516 for each rule in the second user interface 500.

Previously negative list or velocity violations allowed resource providers to skip authorization. However, utilizing the second user interface 500, a resource provider can configure a pre-authorization flag for any type of rule. If the pre-authorization rule evaluates to True, then authorization is skipped and, in some cases, no post-authorization rules are run.

Pre-authorization rule evaluation provides for several advantages. For example, when a pre-authorization rule rejects an access request, the resource provider does not need to continue processing the access request. Further, other computers, such as the authorization server, do not need to process an authorization request message if the security evaluation computer rejects the access request during pre-authorization. By doing so, the various computers can save computing resources. For example, the authorization server can process other authorization request messages that most likely have a higher chance of authorization, allowing more authorized access requests to be processed with the same amount of computational resources.

Additionally, if a pre-authorization rule rejects an access request that is a transaction, the resource provider can avoid placing unnecessary holds on the user's credit card, for example.

Pre-authorization rule evaluation provides for additional advantages. For example, the pre-authorization rule can provide resource providers additional control over if and when an authorization call is made.

Pre-authorization rule evaluation further allows for exemptions to various authentication protocols to be evaluated prior to authorization.

C. Authorization Process with Security Level Flag

Figure 6:
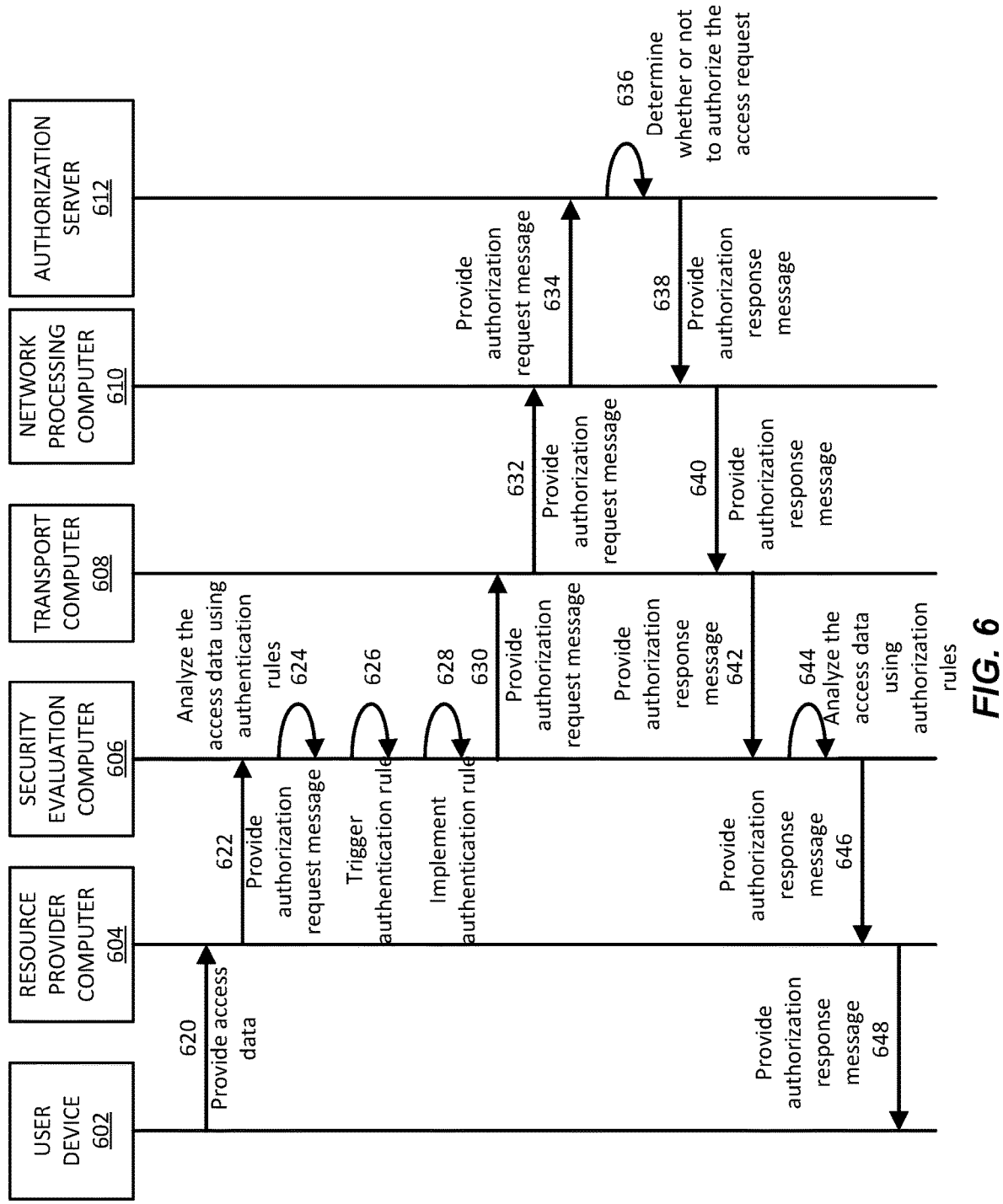
FIG. 6 shows a flowchart of an authentication and authorization process according to embodiments.

FIG. 6 shows a flowchart of an authentication and authorization process according to embodiments. The method illustrated in FIG. 6 describes an authorization process during which a security evaluation computer determines a security level flag. The security level flag can correspond to a particular authentication protocol determine by the security evaluation computer to be applicable to the access request for which authorization is sought.

Prior to step 620, the resource provider computer can access the security evaluation computer (e.g., via an application programming interface (API) or other suitable means) to configure one or more authentication rules. For example, prior to receiving the access data, the security evaluation computer can receive one or more configurations regarding the authentication rules from a resource provider computer. The one or more configurations can include at least one configuration that specifies that the first authentication protocol is to be processed prior to authorizing the access request with the authorization server. However, it is understood that any suitable configuration regarding one or more rules can be provided to the security evaluation computer. Further, in some embodiments, the resource provider computer can provide the authorization rules regarding processing of the authorization response message after authorization by the authorization server to the security evaluation computer.

At step 620, a user device 602 can provide access data to a resource provider computer 604 during an access request. For example, the user of the user device 602 can initiate the access request, such as a transaction, with the resource provider computer 604. The user device 602 can transmit access data including, for example, account information for a payment account. The account information can include a primary account number (PAN), payment token, expiration date, verification values, etc.

At step 622, after receiving the access data from the user device 602, the resource provider computer 604 can generate an authorization request message to authorize the access request. The authorization request message can include the access data and any other suitable data related to the access request. For example, the authorization request message can also include transaction data (e.g., an amount, etc.).

At step 624, after receiving the authorization request message from the resource provider computer 604, the security evaluation computer 606 can analyze the access data using authentication rules. Each authentication rule can specify one of a plurality of authentication protocols for authenticating the user or the user device. In some embodiments, at least one of the authentication rules can specify a security level flag for when no authentication is to be performed.

As an illustrative example, the security evaluation computer 606 can determine that the resource provider previously configured the authentication rules such that a first authentication rule can be performed prior to authorization of the access request. The first authentication rule can indicate that if an amount of the transaction is less than (e.g., does not exceed) a threshold, then no authentication of the user or user device is needed. The security evaluation computer 606 can determine that the amount included in the authorization request message of, for example, $10 is less than a threshold of $25.

Further, the authentication rule can specify a security level flag for when no authentication is to be performed. For example, the security level flag can be a data item that can indicate the associated authentication rule. The security level flag can also represent a particular exemption for why the security evaluation computer determines authentication that authentication need not be performed. In this example, the related exemption can be "low value."

At step 626, the security evaluation computer 606 can trigger the first authentication rule corresponding to a first authentication protocol of the plurality of authentication protocols. For example, the security evaluation computer 606 can trigger the first authentication rule that indicates that no authentication is needed for the $10 purchase.

At step 628, the security evaluation computer 606 can implement the implementing the first authentication protocol. For example, the security evaluation computer 606 can implement the relevant authentication protocol, which in this case, is to not perform authentication.

At step 630, the security evaluation computer 606 can generate and send the authorization request message to a transport computer 608. In some embodiments, the security evaluation computer 606 can include the security level flag into the authorization request message. For example, the security evaluation computer 606 sends the authorization request message in a manner consistent with the first authentication protocol, which can specify to provide the security level flag to the authorization server 612 when no authentication is performed.

At step 632, after receiving the authorization request message, the transport computer 608 can forward the authorization request message to the network processing computer 610.

At step 634, after receiving the authorization request message from the transport computer 608, the network processing computer 610 can transmit the authorization request message to the authorization server 612. In some embodiments, the network processing computer 610 can perform any suitable fraud analysis on the authorization request message prior to transmitting the authorization request message to the authorization server 612.

At step 636, after receiving the authorization request message from the network processing computer 610, the authorization server 612 can determine whether or not to authorize the transaction. For example, the authorization server 612 can analyze the access data and the security level flag. The authorization server 612 can determine whether or not the security level flag that indicates that no authentication was performed due to the low value exemption is accurate (e.g., that the exemption is applicable to the received access data). In some embodiments, the authorization server 612 can determine that authentication of the user and/or the user device 602 should be performed. In such a situation, the authorization server 612 can request the security evaluation computer 606 to authenticate the user and/or the user device 602 in conjunction with an authentication server (not illustrated in FIG. 6).

In other cases, the authorization server 612 can determine that the security level flag and the access data are sufficient for authorization of the transaction. The authorization server 612 can generate an authorization response message including an indication of whether or not the transaction is authorized.

At step 638, the authorization server 612 can transmit the authorization response message to the network processing computer 610.

At step 640, after receiving the authorization response message from the authorization server 612, the network processing computer 610 can transmit the authorization response message to the transport computer 608.

At step 642, the transport computer 608 can transmit the authorization response message to the security evaluation computer 606.

At step 644, after receiving the authorization response message, the security evaluation computer 606 can analyze the access data and the authorization response message using authorization rules to determine whether to complete the access request (e.g., the transaction). For example, the security evaluation computer 606 can determine whether or not any rules configured by the resource provider are 1) configured to be performed after authorization of the transaction and 2) are applicable to the received access data and/or the authorization response message.

For example, the security evaluation computer 606 can determine that the resource provider previously configured a post-authorization rule that indicates to place the transaction in a review queue if the transaction is associated with a high risk score. In this example, the security evaluation computer 606 can determine that the transaction is not associated with a high risk score, and thus not implement the post-authorization rule configured by the resource provider.

At step 646, the security evaluation computer 606 can transmit the authorization response message to the resource provider computer 604.

At step 648, the resource provider computer 604 can provide the authorization response message or the indication of whether or not the transaction is authorized to the user device 602. If the transaction is authorized, then the resource provider can provide the resource to the user of the user device 602.

D. Exemplary Access Request Processing Method

Figure 7:
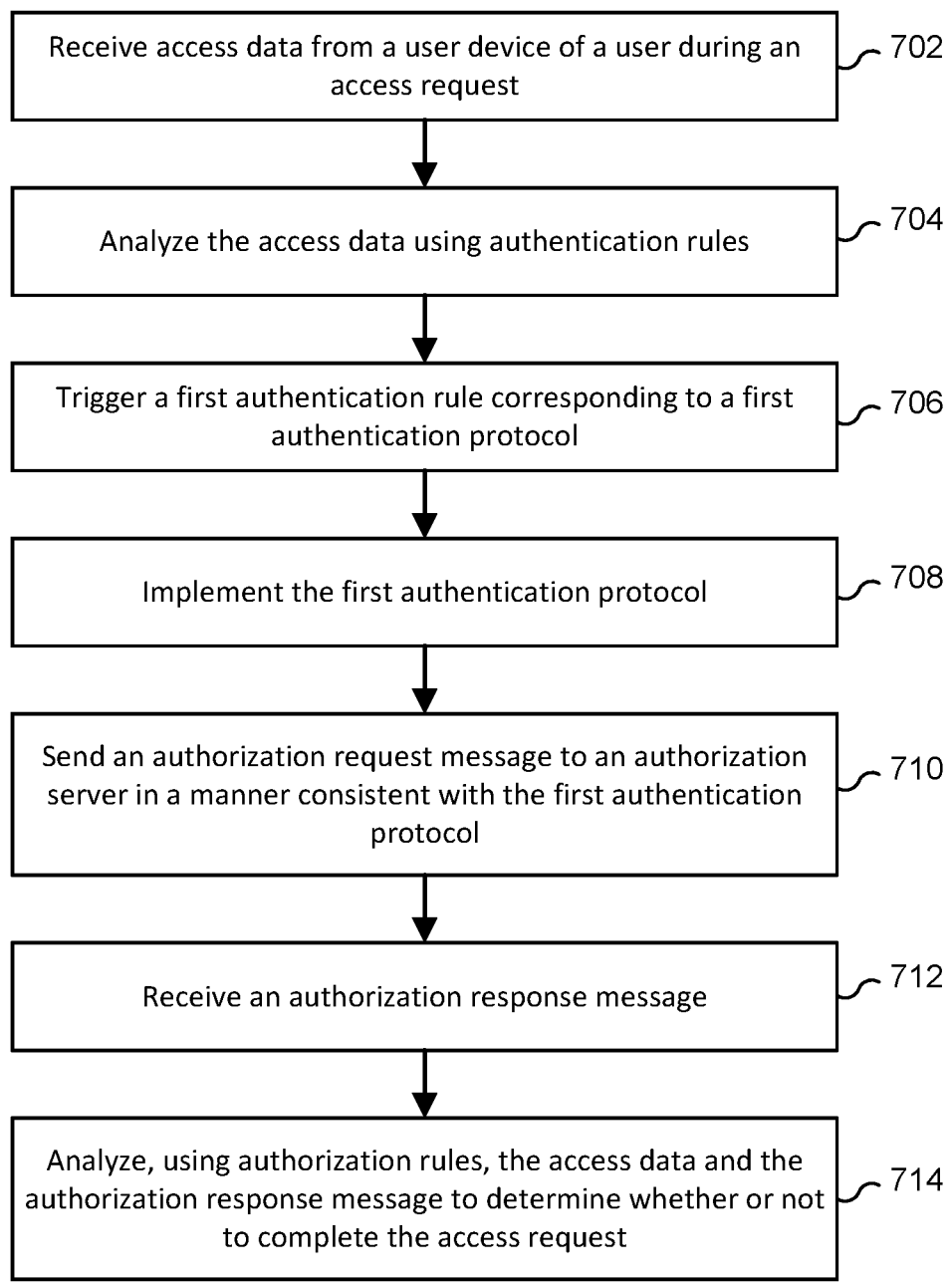
FIG. 7 shows a flowchart of an access request processing method according to embodiments.

FIG. 7 shows a flowchart of an access request processing method according to embodiments. The method illustrated in FIG. 7 can be performed by a security evaluation computer during an access request between a user of a user device and a resource provider of a resource provider computer. It is understood, however, that the invention can be applied to other circumstances in which the access request is a request for data, a request to access a resource, a request to access a secure location, etc.

At step 702, the security evaluation computer can receive access data from a user device of a user during an access request. For example, the access data can include data that can be used to obtain a resource. As another example, access data may be account information for a payment account. The account information can include a primary account number (PAN), payment token, expiration date, verification values, etc.

At step 704, the security evaluation computer can analyze the access data using authentication rules. For example, the security evaluation computer can analyze the access data using authentication rules. Each authentication rule can specify one of a plurality of authentication protocols for authenticating the user and/or the user device. In some embodiments, at least one of the authentication rules can specify a security level flag for when no authentication is to be performed.

At step 706, after analyzing the access data, the security evaluation can trigger a first authentication rule. In some embodiments, the first authentication rule corresponds to a first authentication protocol of the plurality of authentication protocols.

At step 708, the security evaluation computer can implement the first authentication protocol. The first authentication protocol can include any suitable authentication protocol. For example, implementing the first authentication protocol can include determining that the authentication rules of the first authentication protocol specify the security level flag for when no authentication is to be performed. The first authentication protocol can indicate not to authenticate the user.

At step 710, after implementing the first authentication protocol, the security evaluation computer can send an authorization request message to an authorization server in a manner consistent with the first authentication protocol. For example, the first authentication protocol can specify that the security level flag be included into the authorization request message. Upon receiving the authorization request message, the authorizing server can determine to authorize the access request without authenticating the user and/or the user device as specified by the security level flag. In some embodiments, the authorization server can determine to authorize the access request in part based on received authentication data (e.g., if authentication was performed) and the security level flag. The security evaluation computer can then generate an authorization response message and transmit the authorization response message to the security evaluation computer.

At step 712, the security evaluation computer can receive an authorization response message. For example, the security evaluation computer can receive the authorization response message from the authorization server in response to the authorization request message. In some embodiments, the authorization response message can include an indication of whether or not the access request is authorized.

At step 714, the security evaluation computer can analyze the access data and the authorization response message using authorization rules to determine whether or not to complete the access request. For example, the security evaluation computer can utilize an authorization rule, previously configured by the resource provider computer, to determine to complete the access request based on whether or not the access data and/or the authorization response message fulfil a criteria (e.g., a low risk value, a low amount value, consistencies throughout the access request, etc.).

IV. Computer System

Figure 8:
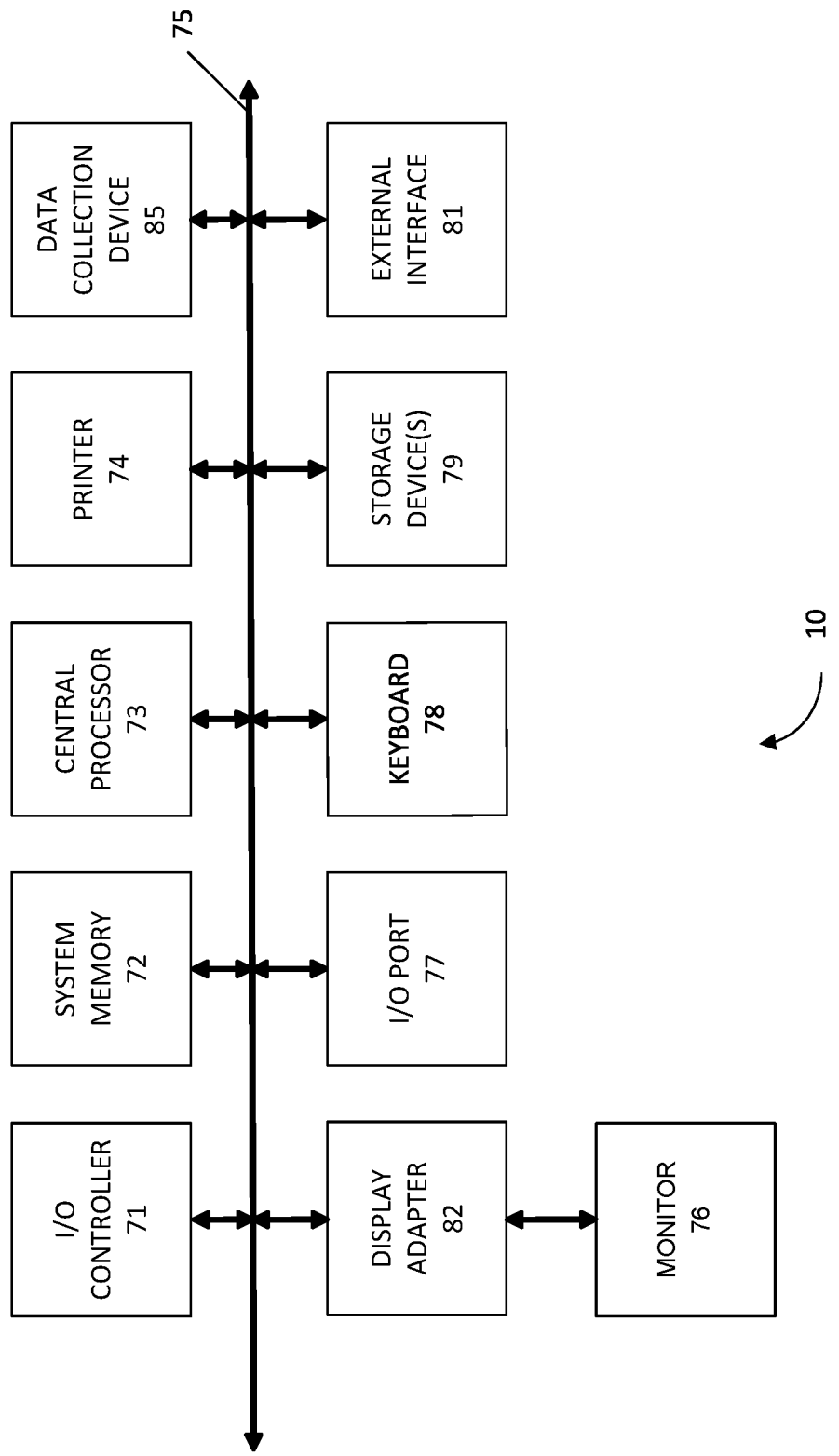
FIG. 8 shows a block diagram of a computer system according to embodiments.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the disclosure have a number of advantages. For example, various embodiments provide for an ability for resource provider computers, in conjunction with security evaluation computers, to control authentication protocols based on data (e.g., access data) regarding a currently being processed access request.

Further, the security evaluation computer advantageously provides one or more user interfaces that the resource provider can utilize to influence if and when particular rules are implemented. For example, the resource provider can configure the security evaluation computer to evaluate a particular rule prior to authorization of the access request or after authorization of the access request.

Without such control over various rule configurations, each different resource provider would need to individually perform additional processing to determine whether or not authentication is needed for an access request and how strong the authentication would need to be. This is a large burden placed upon the resource providers, whom would need make these individual determinations in real-time during the access request. In other cases, without the control provided by embodiments, a resource provider may determine that a strong authentication should be implemented for every access request. However, such a situation is not optimal because the resource provider is expending additional computation resources (e.g., computing power) when no authentication may be needed. This in turn can slow down an entire access request system, as too many extraneous authentication requests can burden the system.

Various embodiments provide for advantages over such systems by being able to determine security level flags for access requests during an access request prior to authorization of the user or user device. Such real-time determinations can prevent erroneous and extraneous authentication request messages.

Although the steps in the flowcharts and process flows described above are illustrated or described in a specific order, it is understood that embodiments of the invention may include methods that have the steps in different orders. In addition, steps may be omitted or added and may still be within embodiments of the invention.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method comprising:
receiving, by a security evaluation computer, access data from a user device of a user during an access request;

analyzing the access data using authentication rules that each specify one of a plurality of authentication protocols for authenticating the user or the user device, wherein at least one of the authentication rules specifies a security level flag for when no authentication is to be performed;

triggering a first authentication rule corresponding to a first authentication protocol of the plurality of authentication protocols;

implementing the first authentication protocol, wherein the implementing the first authentication protocol comprises:

determining that the authentication rules of the first authentication protocol specify the security level flag for when no authentication is to be performed; and including the security level flag for when no authentication is to be performed into an authorization request message;

sending the authorization request message to an authorization server in a manner consistent with the first authentication protocol;

receiving an authorization response message; and analyzing, using authorization rules, the access data and the authorization response message to determine whether to complete the access request.

2. The method of claim 1, wherein the authorization server determines to authorize the access request without authenticating the user or the user device as specified by the security level flag, generates the authorization response message including an indication of whether or not the access request is authorized, and transmits the authorization response message to the security evaluation computer.

3. The method of claim 1, wherein the authorization server determines not to authorize the access request without authenticating the user or the user device as specified by the security level flag, generates a retry authentication request indicating to authenticate the user or the user device, transmits the retry authentication request to the security evaluation computer.

4. The method of claim 3 further comprising:
receiving the retry authentication request;
triggering a second authentication rule corresponding to a second authentication protocol of the plurality of authentication protocols;
implementing the second authentication protocol; and
sending an additional authorization request message to the authorization server in a manner consistent with the second authentication protocol.

5. The method of claim 1, wherein implementing the first authentication protocol further comprises:
determining that the authentication rules of the first authentication protocol specify the security level flag for when authentication is to be performed;
generating an authentication request message comprising a request to authenticate the user or the user device;
sending the authentication request message to an authentication server, wherein the authentication server authenticates the user or the user device according to the first authentication protocol and generates an authentication response message including authentication data indicating whether or not the user or the user device is authenticated;
receiving the authentication response message; and
including the security level flag for when authentication is to be performed and the authentication data into the authorization request message.

6. The method of claim 5, wherein the authorization server determines to authorize the access request in part based on the authentication data and the security level flag, generates the authorization response message including an indication of whether or not the access request is authorized, and transmits the authorization response message to the security evaluation computer.

7. The method of claim 5, wherein the authentication request message comprises the access data.

8. The method of claim 1 further comprising:
prior to receiving the access data, receiving, by the security evaluation computer, one or more configurations regarding the authentication rules from a resource provider computer.

9. A security evaluation computer comprising:
a processor; and
a computer-readable medium coupled to the processor, the computer-readable medium comprising code executable by the processor for implementing a method comprising:
receiving access data from a user device of a user during an access request;
analyzing the access data using authentication rules that each specify one of a plurality of authentication protocols for authenticating the user or the user device, wherein at least one of the authentication rules specifies a security level flag for when no authentication is to be performed;
triggering a first authentication rule corresponding to a first authentication protocol of the plurality of authentication protocols;
implementing the first authentication protocol, wherein the implementing the first authentication protocol comprises:
determining that the authentication rules of the first authentication protocol specify the security level flag for when no authentication is to be performed; and
including the security level flag for when no authentication is to be performed into an authorization request message;
sending the authorization request message to an authorization server in a manner consistent with the first authentication protocol;
receiving an authorization response message; and
analyzing, using authorization rules, the access data and the authorization response message to determine whether to complete the access request.

10. The security evaluation computer of claim 9, wherein analyzing, using the authorization rules, the access data and the authorization response message to determine whether to complete the access request further comprises:
determining whether or not one of the authorization rules applies to the access data and/or the authorization response message; and
determining whether or not the access data and/or the authorization response message satisfies a criteria specified by the authorization rules.

11. The security evaluation computer of claim 9, wherein the method further comprises:
prior to receiving the access data, receiving, from a resource provider computer, one or more configurations regarding the authentication rules and the authorization rules regarding processing of the authorization response message after authorization by the authorization server to the security evaluation computer.

12. The security evaluation computer of claim 9, wherein the access request is a data access request, a secure webpage access request, or a secure location access request.

13. The security evaluation computer of claim 9, wherein the access data is received from a resource provider computer and wherein after analyzing, using the authorization rules, the access data and the authorization response message to determine whether to complete the access request the method further comprises:

sending the authorization response message to the resource provider computer.

14. The security evaluation computer of claim 9, wherein the method further comprises:

retrieving, from a memory, the authentication rules that are associated with a resource provider identifier received along with the access data.

15. The security evaluation computer of claim 9, wherein the access data is received in the authorization request message and wherein the method further comprises:

prior to sending the authorization request message, the security evaluation computer modifies the authorization request message to include the security level flag.

16. A method comprising:

receiving, by a resource provider computer, access data from a user device of a user during an access request;

generating, by the resource provider computer, an authorization request message comprising the access data to a security evaluation computer, wherein the security evaluation computer:

analyzes the access data using authentication rules that each specify one of a plurality of authentication protocols for authenticating the user or the user device, wherein at least one of the authentication rules specifies a security level flag for when no authentication is to be performed, triggers a first authentication rule corresponding to a first authentication protocol of the plurality of authentication protocols, implements the first authentication protocol, wherein the implementing the first authentication protocol comprises:

determining that the authentication rules of the first authentication protocol specify the security level flag for when no authentication is to be performed; and including the security level flag for when no authentication is to be performed into the authorization request message;

sends the authorization request message to an authorization server in a manner consistent with the first authentication protocol, receives an authorization response message, and analyzes using authorization rules, the access data and the authorization response message to determine whether to complete the access request;

receiving, by the resource provider computer, the authorization response message if the security evaluation computer determines to complete the access request; and providing, by the resource provider computer, the authorization response message to the user device.

17. The method of claim 16 further comprising:

prior to providing the access data, providing, by the resource provider computer, one or more configurations regarding the authentication rules to the security evaluation computer.

18. The method of claim 17, wherein the one or more configurations include at least one configuration that specifies that the first authentication protocol is to be processed prior to authorizing the access request with the authorization server.

19. The method of claim 16 further comprising:

prior to providing the access data, providing, by the resource provider computer, the authorization rules regarding processing of the authorization response message after authorization by the authorization server to the security evaluation computer.

\* \* \* \* \*